June 11, 1957 H. BRYANT ET AL 2,795,704
NEUTRON ION CHAMBER
Filed April 15, 1954

INVENTOR.
Harry Bryant
George F. Erickson
Stefan G. Kaufmann
BY:
ATTORNEY

United States Patent Office 2,795,704
Patented June 11, 1957

2,795,704
NEUTRON ION CHAMBER

Harry Bryant, Park Forest, George F. Erickson, Chicago, and Stefan G. Kaufmann, Lombard, Ill., assignors to the United States of America as represented by the United States Atomic Energy Commission Application April 15, 1954, Serial No. 423,547

14 Claims. (Cl. 250—83.1)

This invention relates to a device and method for measuring neutron flux density and in particular to a device and method for measuring the neutron flux density in a radiation field which is a composite of neutron and gamma radiations.

In the detection and measurement of neutrons, it is common to place in an ionization chamber a material, such as boron, which produces ionization of a gas in the chamber in response to neutron bombardment; the magnitude of ionization in the chamber thus being a measure of the neutron flux. However, when other radiations, notably gamma rays, are also present, the measured ionization becomes an uncertain indicator of the neutron flux density because of the variations in the intensity of the other radiations. One means for discriminating against radiations such as gamma rays, which is in use at the present time, is the employment of differential chambers, one chamber being sensitive to both gamma rays and neutrons and the other chamber sensitive only to gamma rays. The difference between the effects of ionization produced by the two differential chambers varies only in accordance with the neutron flux.

In the past, various types of neutron measuring devices have been devised which use multiple chambers, having specially prepared linings, which are interconnected by circuits in such a manner as to balance out the ionization effects produced by gamma radiation but to measure the magnitude of ionization caused by the neutron bombardment. The multi-chamber devices are expensive due to the quantity of material required and the amount of labor expended in their manufacture. They frequently require inspection and calibration to achieve balancing out of the effects of the gamma ray ionization.

An object of the invention is to provide an economical and reliable neutron-detecting device and method of operating same that will give a reliable indication of neutron intensity in the presence of substantial gamma ray intensities.

Another object of the invention is to provide a neutron-detecting device that is relatively simple in construction and easy to operate without the requirement of frequent maintenance and constant calibration checks.

A further object of this invention is to provide a device which will generate an A.-C. signal by itself for measurement purposes without the necessity of employing other electrical components and equipment to provide an A.-C. signal for energization purposes.

Other objects and advantages will become more apparent from a study of the following specification taken in conjunction with the accompanying drawing comprised of three figures.

Figure 1:
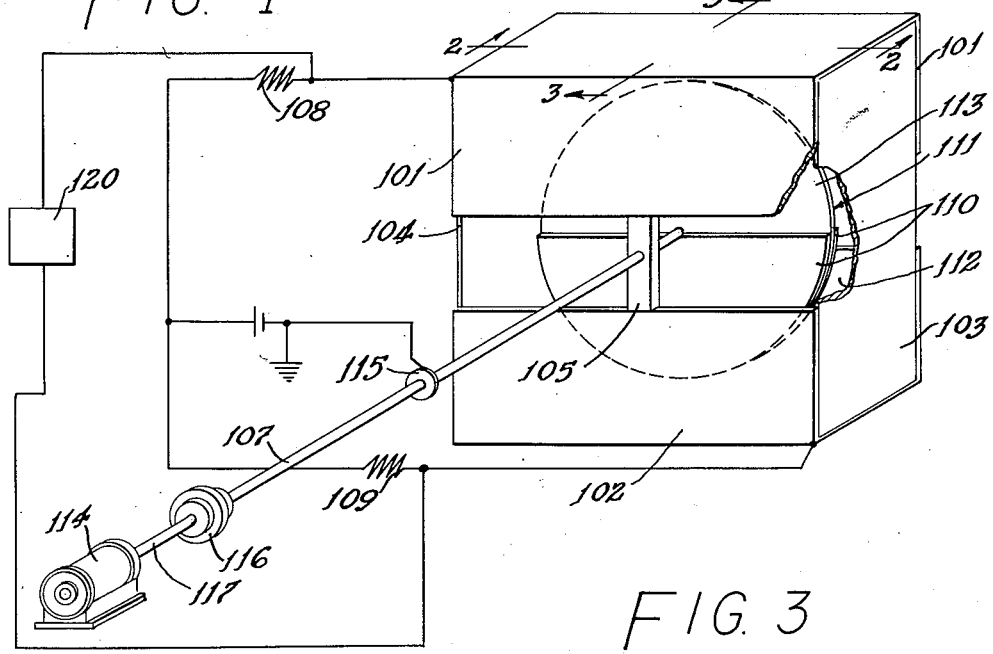
Figure 1 shows a schematic diagram of a circuit connected to the neutron-detecting device embodying the teachings of this invention.
Figure 2:
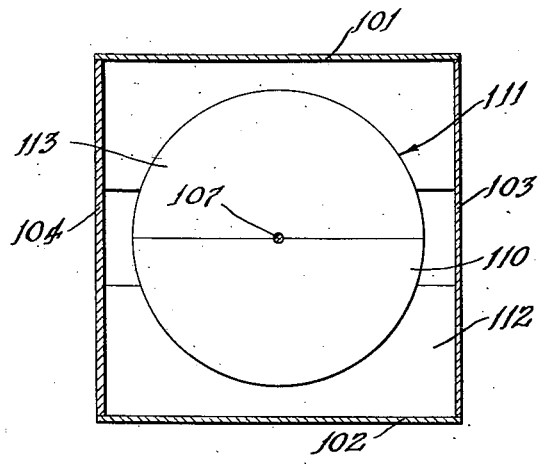
Figure 2 is a cross-sectional view of the device of Figure 1 taken along the line 2—2.
Figure 3:
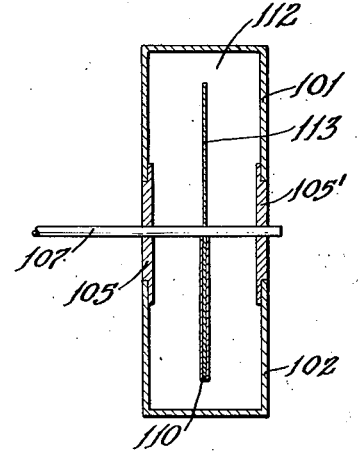
Figure 3 is a cross-sectional view of the device of Figure 1 taken along the line 3—3.

Referring to Figure 1, the stationary structure of the ion chamber device comprises two electrode members 101 and 102, each formed in the shape of a U, and oppositely situated to each other and held together by means of side members 103 and 104. The trough-shaped electrode members 101 and 102 are made of any suitable electrical conducting material. The side members 103 and 104 are made of any insulating material and function in conjunction with the electrode members 101 and 102 to form an ionization space 112. Centrally located within the chamber 112 is a disk plate 111 which is supported therein by a shaft 107 in cooperation with insulating brace members 105 and $105^1$. The brace members 105 and $105^1$ may be seen in Figure 3.

One-half of the disk plate 111 is covered or coated on both sides of the disk with a neutron-responsive material to produce gas ionization, such as $B^{10}$, and is indicated by a numeral 110. The other half of the disk 111 is devoid of any coating and is indicated by a numeral 113. A resistor 108 is connected to the electrode member 101; the other extremity of the resistor 108 is connected to a resistor 109 the other end of which is connected to the other electrode member 102. The spacing between the disk 111 and the electrode members 101 and 102 is within the range used in conventional ionizing chambers.

One end of the shaft 107 is coupled to a source of motive power, such as a motor 114, via a coupling 116 which functions to transmit motion to the disk plate 111 and also to isolate electrically the shaft 107 from the motor shaft 117. The junction point of the resistors 108 and 109 is connected to the positive terminal of a battery. The negative terminal of the battery is connected to the shaft 107 (made of an electrically conducting material) via a slip ring 115. The negative terminal of the battery is grounded. A measuring instrument 120 is connected across both of the resistors 108 and 109 to measure the voltage drop across said resistors.

It is to be understood that the drawing represents only the essentials of the present invention. Many of the details of a regular working model have been left off to portray as clearly as posible the principle of operation.

*Operation.*—The grounded circular metal plate 111 (Fig. 1) of which one-half is coated with $B^{10}$ (shaded area) as indicated by the numeral 110 rotates in the ionization space 112 between the electrode members 101 and 102. A potential is established by the battery through the resistors 108 and 109 between the electrode members 101 and 102 and the rotating plate 111 such that the current flowing into the member 101 causes a voltage drop across the resistor 108. When the $B^{10}$ coated area 110 is fully meshed with the electrode member 101, the neutron signal from the electrode member 101 will be at a maximum, and that from the electrode member 102 will be essentially zero because it is devoid of any neutron-responsive material. The gamma signal from the electrode member 101 will equal the signal from the electrode member 102, and will be independent of the rotation of the plate 111; hence, the gamma signal will remain constant as long as the level of the gamma radiation itself remains constant. As the $B^{10}$ coated area 110 of the plate 111 begins to move out of mesh with the electrode member 101, the neutron signal from the electrode member 101 will begin to fall off and that from the electrode member 102 will begin to rise since the $B^{10}$ coated area 110 will now begin to mesh with the electrode member 102. When the $B^{10}$ coated area 110 reaches full mesh with the electrode member 102, the neutron signal from the electrode member 101 will go down to zero and that from the electrode member 102 will reach a maximum. The bombardment of the coated area 110 by the neutrons will irradiate the space existing between the plate section 110 and the electrode member 102 causing the air or gas, whichever may be contained in the ionizing space 112, to become ionized and to conduct a current at a greater rate in the space across which a potential is impressed by the battery. For example, a typical circuit extends from the positive terminal of the battery, through the resistor 109, electrode member 102, across the interelectrode spaces existing between the electrode member 112 and the plate section 110, plate section 110, the shaft 107, and through the slip ring 115 to the negative terminal of the battery. As the rotation continues, an alternating current signal of a frequency proportional to the speed of the rotation and the amplitude proportional to neutron flux will be produced alternately across each resistor. The ionization variation caused by the rotation of the disk 111 within the space 112 will cause a current variation to occur in the resistors 108 and 109. By suitable means, such as the measuring instrument 120, these current variations may be detected through the resistors 108 and 109, amplified thereafter, and then used to actuate other indicating means if necessary. The frequency of the A. C. signal can be controlled by varying the speed of rotation.

In the present invention, in its broader aspects, a material like boron, which is responsive to neutrons, is repeatedly inserted into and removed from an ionization chamber having electrodes therein separated by ionizing space which electrodes are connected in series with an electrical circuit. The active material may be integral to one of the electrodes. The gamma ray background will produce a steady current which will be essentially unaffected by the introduction and removal of the neutron-sensitive material. The neutron flux is indicated by the magnitudes of the variations which are superimposed upon this background by the periodically repeated insertion of the neutron-sensitive material. These variations constitute an alternating current component of the chamber output current which may be readily separated from the steady gamma ray current by such conventional means as an alternating current amplifier.

While there has been shown and described a specific embodiment of this invention, further modifications and improvements thereof are possible by those skilled in the art. It is to be understood, therefore, that this invention is not limited to the specific form shown and it is intended in the appended claims to cover all modifications which do not depart from the spirit and scope of this invention.

What is claimed is:

1. An apparatus for measuring the radiation intensity of neutrons in a field comprising various types of radiations, said apparatus comprising an ionizing chamber having a pair of electrodes, a movable element within said chamber, a portion of said element responsive to neutron bombardment to produce ionization, means to impress a potential between said element and each of said electrodes, means for moving the neutron-responsive portion of said movable element past said electrodes to vary the ionization between said element and each of said electrodes to thereby vary the potential between said element and each of said electrodes, and means for detecting the variation in potential.

2. An apparatus for measuring neutron intensity and discriminating between neutron and gamma ray ionization effects, said apparatus comprising an ionization chamber having a pair of electrodes, a movable element in said chamber adjacent to said electrodes and forming ionization discharge gaps therebetween, a portion of said element responsive to neutron bombardment to produce ionization, circuit means connecting said element to each of said electrodes to impress a potential across said gaps, means for moving said element to change ionization in said gaps to produce a variation of potential across each gap whereby the potential drop across each gap varies with the displacement of the neutron-responsive portion of the movable element from each of said electrodes.

3. An apparatus for measuring neutron intensity and discriminating between neutron and gamma ray ionization effects, said apparatus comprising an ionizing chamber having a pair of electrodes, a movable element having a part thereof producing ionizing radiations in response to neutron bombardment, said element forming ionization gaps with each of said electrodes, means connecting said element in series with each of said electrodes and its respective gap to impress a voltage across each gap, means for moving the neutron-responsive portion of said element in said gaps to generate an alternating current in said last means and means for measuring the magnitude of the alternating current, representative of the intensity of the neutron radiation.

4. An ionization chamber system for measuring neutron intensity in the presence of gamma rays comprising a first electrode, means for mounting said electrode in a stationary position, a movable disk electrode spaced from the stationary electrode and having at least one segment of a material producing ionizing radiations in response to neutron bombardment and at least one other segment free of such material, means for rotating successive segments of the disk electrode past the stationary electrode, means for maintaining a potential between the electrodes, and means for measuring the alternating component of the ionization current between the electrodes.

5. An ionization chamber system for measuring neutron intensity in the presence of gamma rays comprising a pair of electrodes having an ionization region therebetween, a body of material producing ionizing radiations in response to neutron bombardment, and means including a motor for cyclically introducing said body into and withdrawing said body from the ionization region.

6. An ionization chamber system for measuring neutron intensity in the presence of gamma rays comprising a pair of stationary electrodes oppositely mounted, a rotatable electrode having a segment thereof responsive to neutron bombardment to produce ionization, said rotatable electrode forming a plurality of gaps with said stationary electrodes, circuit means connecting said rotatable electrode to each of said stationary electrodes to impress a potential across each of said gaps, means for rotating said rotatable electrode to move the ionization existing in the gap between the responsive segment of said rotatable electrode and an adjacent stationary electrode to another gap, and means for measuring a potential drop across each gap due to a change of said ionization.

7. An ionization chamber system for measuring neutron intensity in the presence of gamma radiation comprising a plurality of stationary electrodes, a movable electrode having a portion thereof responsive to neutron bombardment to produce ionization, said movable electrode adjacent to said stationary electrodes and forming ionization gaps between the movable electrode and the respective stationary electrodes, means for actuating said movable electrode to vary the ionization in said gaps, a balancing network connecting said movable electrode to each of said stationary electrodes to balance out the ionization effects of gamma radiation and to measure the ionization induced by said neutron bombardment.

8. An ionization chamber system for measuring neutron intensity in the presence of gamma rays comprising a pair of electrodes, a movable element responsive to neutron bombardment to produce ionizing radiations, means including a motor for cyclically inserting said element between said electrodes and withdrawing said element from therebetween, and means for detecting the variation of the ionization between said electrodes.

9. An ionization chamber system for measuring the intensity of a particular radiation in the presence of other radiations comprising a pair of electrodes forming a space therebetween, a movable element to produce ionizing radiations in response to activation by said particular radiation, means including a motor for cyclically inserting said element between said electrodes and withdrawing said element from therebetween, and means for measuring the variation in ionization between said electrodes.

10. The ionization chamber system as claimed in claim 9 wherein the movable element comprises a compound of boron isotope 10.

11. An ionization chamber system for measuring a particular radiation in the presence of other types of radiations comprising a pair of electrodes with a space therebetween, an element to produce ionizing radiations in response to activation by said particular radiation, means including a motor for producing cyclical movements between said electrodes and said element to effect changes in ionization, and means for measuring the variation in said ionization between said electrodes.

12. The ionization chamber system as claimed in claim 11 wherein the element comprises a compound of boron isotope 10.

13. An apparatus for measuring the radiation intensity of neutrons in a field comprising various types of radiations, said apparatus comprising an ionization chamber having a pair of trough-shaped electrodes oppositely situated to form a part of said chamber, a pair of insulating members for mounting said electrodes in opposition to each other and adapted to form a chamber with said electrodes, a rotatable electrode including a shaft mounted within said chamber to form ionization gaps between said rotatable electrode and said pair of electrodes, a coating of neutron-responsive material covering one-half of said rotatable electrode to produce ionizing radiations, a motor, insulating means coupling one end of the shaft to said motor to actuate the rotatable electrode to move the coated portion of said electrode out of one gap into the other gap, a pair of resistors, each of said resistors associated with one electrode of said pair of electrodes, a battery having one grounded terminal and one free terminal, slip ring means connecting the grounded terminal of said battery through said shaft to said rotatable electrode, means connecting each of said resistors between its respective electrode and the free terminal of said battery to impress a potential across its associated gap, and means connected to ground and to each of said resistors to detect current variations therein due to potential variations across the gaps caused by ionization.

14. An ionization chamber system for measuring neutron intensity in the presence of gamma rays comprising a pair of electrodes having an ionization region therebetween, an element of material producing ionizing radiation in the ionization region in response to neutron bombardment, means including a motor for producing cyclical relative movements between the element and the ionization region to effect cyclical changes in ionization, and means for measuring the cyclical variation in said ionization.

References Cited in the file of this patent
UNITED STATES PATENTS

| | | |
|---|---|---|
| 2,275,748 | Fearon | Mar. 10, 1942 |
| 2,440,167 | Broxon et al. | Apr. 20, 1948 |
| 2,495,650 | Blair et al. | Jan. 24, 1950 |